United States Patent [19]

Rapp

[11] 4,142,986
[45] Mar. 6, 1979

[54] GLASSES SUITABLE FOR LASER APPLICATION

[75] Inventor: Charles F. Rapp, Toledo, Ohio

[73] Assignee: Owens-Illinois, Inc., Toledo, Ohio

[21] Appl. No.: 897,990

[22] Filed: Apr. 20, 1978

[51] Int. Cl.² .......................... C03C 3/18; C09K 11/46; H03F 1/22

[52] U.S. Cl. .......................... 252/301.4 P; 106/47 Q; 106/47 R; 252/301.4 H; 331/94.5 E

[58] Field of Search ............................ 106/47 Q, 47 R; 252/301.4 P, 301.4 H, 301.4 F, 301.4 R

[56] References Cited

U.S. PATENT DOCUMENTS

| 2,511,224 | 6/1950 | Sun et al. ............................ 106/47 R |
| 2,716,069 | 8/1955 | Pincus ................................ 106/47 Q |
| 4,075,120 | 2/1978 | Myers et al. .................. 252/301.4 P |
| 4,076,541 | 2/1978 | Rapp ............................ 252/301.4 P |

FOREIGN PATENT DOCUMENTS 2304582  10/1976  France ................................. 106/47 Q

OTHER PUBLICATIONS

Hopkins, R. H. et al., "Silicate Oxyapatites: New High-Energy Storage Laser Hosts for $Nd^{+3}$", J. Electro Chem. Soc. (USA), 118, No. 4, (Apr. 1971), pp. 637–639.

*Primary Examiner*—Helen McCarthy
*Attorney, Agent, or Firm*—Charles S. Lynch; M. E. Click; D. H. Wilson

[57] ABSTRACT

Disclosed are phosphorus glasses containing beryllium and fluorine and $Nd^{3+}$ as the active lasing species.

8 Claims, No Drawings

GLASSES SUITABLE FOR LASER APPLICATION

The present invention relates to novel glass compositions having certain valuable properties and, more particularly, to glass compositions which are useful for glass laser components.

The term "laser" is an acronym for "light amplification by stimulated emission of radiation." A laser is a device capable of amplifying or generating coherent light. For example, lasers can be used to generate monochromatic optical radiation in the form of a plane wave with a beam angle divergence theoretically limited by diffraction effects. When a material exhibits stimulated emission of radiation under a particular set of conditions it is said to "lase."

The configuration of the laser body itself may take various forms. For example, it may be in the form of a small cylinder or rod the end faces of which are plane and which may have an extremely high degree of parallel accuracy. The glass laser component may also be in the form of a disc or a slab configuration, etc. Furthermore, the laser body can be used either as an oscillator or as an amplifier; see for instance the book "Glass Lasers" by K. Patek, CRC Press, Cleveland, 1970, especially Chapters 12 and 13. In any event, it will be apparent that the configuration and characteristics of the laser body may vary widely and are not critical features of the present invention. In actual operation, the laser body can be irradiated by suitable means such as a flash lamp operating for a few milliseconds or less. However, other excitation sources such as another laser can be used. Also, in some applications continuous excitation, rather than pulsed excitation, is employed. Further information concerning lasers will be found in the book entitled, "Introduction to Laser Physics," by Bela A. Lengyel, John Wiley & Sons, New York, 1966.

An ever sought after set of properties for laser glasses is the combination of high fluorescent decay times ($\tau$) at narrow emission line widths ($\Delta\lambda$), coupled with a high cross-section of stimulated emission ($\sigma$), as well as a low non-linear index of refraction ($n_2$).

Recently I invented phosphate laser glasses having improved fluorescent decay times of about 300 microseconds at narrow line widths and improved $n_2$ values. See U.S. Pat. No. 4,076,541. More recently I have developed fluorophosphate laser glasses with longer decay times and much lower $n_2$ values. See example 5, for instance, shown in Table 1 herein.

It is an object of the invention to provide glasses having $Nd^{3+}$ as the active losing species and having an improved combination of long fluorescent decay times (over 450 microseconds at a wave length of about 1050 nm), high cross-section of stimulated emission (over 3.3 × $10^{-20} cm.^2$) and low $n_2$ values (less than 0.6 × $10^{-13} cm.^2/(statvolts)^2$.

It is a further object of the present invention to provide a method for making such glasses.

Other objects, as well as aspects and advantages, of the present invention will become apparent from a study of the present disclosure and the claims.

These and other objects of the present invention are accomplished by providing new fluorophosphate beryllium-containing glasses having $Nd^{3+}$ as an active lasing species, as more fully described hereinafter.

Thus, according to one aspect of the present invention there is provided a laseable glass containing neodymium as the active lasing species, having the following formula $$A_h Be_k^{2+} Al_l^{3+} Nd_m^{3+} P_n^{5+} (O_x^{2-} F_y^{1-})$$

where A represents cations which can be at least one of $Na^{1+}$, $Li^{1+}$, $K^{1+}$, $Rb^{1+}$ and $Cs^{1+}$ (and is usually $Na^{1+}$) where $2x + y$ is always 1 and where h, k, l, m and n, respectively, indicate the number of respective cations relative to the anions, oxygen plus fluorine, and where x is in the range from 2n to 3.2n, h is from 0.05 to 0.25, k is from 0.1 to 0.35, l is from zero to 0.15, m represents a laseable amount of Nd up to 0.015 (usually at least 0.0001) and n is 0.02 to 0.15. More usually, h is from 0.08 to 0.2, k is from 0.15 to 0.3, and l is from zero to 0.1. The glasses of the above formula consist essentially of the above ions in the noted amounts, but small amounts of other cations that do not materially adversely affect the properties of the glasses of the invention discussed herein can be included. Furthermore, the usual small amount of one of the usual solarization inhibitors can be included when needed. These glasses of the present invention have the properties set forth hereinbefore in the objects of this invention. Pincus in U.S. Pat. No. 2,716,069 discloses certain Nd-free glasses, certain of which otherwise have the same components as my glasses and thus could be calculated to have low $n_2$ values from the disclosed $n_D$ values and Abbe number values (called Nu value in Pincus). Such glasses are not disclosed as hosts for laseable ions. Moreover, the high fluorescent decay times and high cross sections of stimulated emission of my glasses are not predictable or suggested by the information disclosed in Pincus.

The glasses of the invention are prepared from suitable batch materials by melting in a suitable electric or gas-fired furnace, suitably in air, care being taken to avoid health hazard to pesonnel caused by contact with batch materials or vapors, particularly with respect to the well-known hazard connected with beryllium compounds.

EXAMPLE 1

A laser glass having the following composition

|         | Mole % |
|---------|--------|
| $NaPO_3$ | 11.2   |
| NaF     | 24.5   |
| $AlF_3$ | 15     |
| $BeF_2$ | 48.7   |
| $NdF_3$ | 0.57   | was prepared from chunks of glassy $BeF_2$ and particulate sodium metaphosphate, sodium fluoride, aluminum fluoride and neodymuin fluoride, each of which was previously dried by heating. The batch materials were essentially pure. Melting was at 1700° F in a platinum crucible in an electric muffle furnace in air. However, the crucibles were covered with platinum foil. The batch was charged over a period of 45 minutes and melting effected for 45 minutes more. During melting the melt was twice stirred by hand with a platinum stirring rod. Then several glass patties 2¼ inches in diameter and ½ inch thick were cast in graphite molds. The glass was light purple, transparent and without devitrification. The patties were annealed for 1 hour at 375° F.

A number of other glasses of the invention were similarly made and properties of all of these glasses are given in Table 1, as well as properties of the fluorophosphate glass of Example 5.

The approximate formulas for glasses 1–4 of the invention shown in Table 1 were as follows:

| Example | Formula |
|---|---|
| 1 | $Na_{0.15}^{1+}Be_{0.21}^{2+}Al_{0.06}^{3+}Nd_{0.002}^{3+}P_{0.048}^{5+}(O_{0.14}^{2-}F_{0.71}^{1-})$ |
| 2 | $Na_{0.15}^{1+}Be_{0.17}^{2+}Nd_{0.002}^{3+}P_{0.1}^{5+}(O_{0.3}^{2-}F_{0.4}^{1-})$ |
| 3 | $Na_{0.18}^{1+}Be_{0.24}^{2+}Nd_{0.002}^{3+}P_{0.07}^{5+}(O_{0.2}^{2-}F_{0.6}^{1-})$ |
| 4 | $Na_{0.11}^{1+}Be_{0.25}^{2+}Al_{0.05}^{3+}Nd_{0.002}^{3+}P_{0.05}^{5+}(O_{0.14}^{2-}F_{0.72}^{1-})$ |

Examples 1–4 are illustrative, exemplary only and are not meant to be exhaustive. At the present time Examples 1 and 4 are felt on balance to represent the best mode of the invention as meant by 35 U.S.C. 112.

In Table 1, the value shown for $n_2$ when multiplied by $10^{-13}$ gives $n_2$ in cm.$^2$/(statvolts)$^2$. The non-linear index of refraction, $n_2$, is found by the formula, where $v_D$ is the Abbe number:

$$n_2 \times 10^{13} = \frac{68(n_D - 1)(n_D^2 + 2)^2}{v_D[1.5 + (n_D^2 + 2)(n_D - 1)v_D/6n_D]^{\frac{1}{2}}} \text{ cm.}^2/\text{(statvolts)}^2$$

A combination of a high Abbe number and a low index of refraction, $n_D$, results in a low non-linear index of refraction, $n_2$. A laser glass component with a relatively high $n_2$ tends to self-focus, especially when used in very high peak power neodymium glass lasers. Self-focusing causes permanent damage to a neodymium glass laser component. It is thus important that neodymium laser glasses and glass laser components have as low a non-linear index of refraction as possible.

| | Mole Parts | | | | |
|---|---|---|---|---|---|
| Example: | 1 | 2 | 3 | 4 | 5 |
| Components | | | | | |
| Al(PO$_3$)$_3$ | | | | | 4 |
| NaPO$_3$ | 11.2 | 30.9 | 16 | 11.1 | — |
| AlF$_3$ | 15 | — | — | 12.1 | 32 |
| LiF | | | | | 4 |
| NaF | 24.5 | 15 | 25.8 | 16.2 | 4 |
| BeF$_2$ | 48.7 | 53.5 | 57.7 | 60.1 | — |
| MgF$_2$ | — | — | — | — | 9 |
| CaF$_2$ | — | — | — | — | 29 |
| SrF$_2$ | — | — | — | — | 9 |
| BaF$_2$ | — | — | — | — | 9 |
| NdF$_3$ | 0.57 | 0.62 | 0.54 | 0.56 | 1 |
| Density, gms./cc. | 2.524 | 2.475 | 2.38 | 2.435 | 3.47 |
| $n_D$ | 1.356 | 1.394 | 1.355 | 1.343 | 1.443 |
| $v_D$ | 93 | 80 | 87 | 93 | 92.2 |
| $n_2$ | 0.37 | 0.54 | 0.41 | 0.36 | 0.52 |
| Effective $\Delta\lambda$ (nm) (line width) | 21.8 | 22.0 | 20.5 | 22.0 | 30.4 |
| Peak $\lambda$ | 1046 | 1048 | 1047 | 1046 | 1050 |
| $\tau$ in microseconds | 700 | 557 | 626 | 717 | 500 |
| $\sigma \times 10^{-20}$ (in cm.$^2$) at about 1050 nm | 3.7 | 4.2 | 4.4 | 3.7 | 2.6 |

As will be evident to those skilled in the art, various modifications of this invention can be made or followed in the light of the foregoing disclosure and discussion without departing from the spirit and scope of the disclosure or from the scope of the claims.

I claim:

1. A glass composition suitable for use as an active laser component and consisting essentially of the following components in the relationship expressed according to the following atomic formula $$A_h Be_k^{2+} Al_l^{3+} Nd_m^{3+} P_n^{5+} (O_x^{2-} F_y^{1-})$$

wherein

A is at least one of the group Na$^{1+}$, Li$^{1+}$, K$^{1+}$, Rb$^{1+}$ and Cs$^{1+}$, neodymium is present in a laseable amount up to m = 0.015, 2x plus y as always 1, h, k, l, m and n represent the number of atoms to which they are subscripted with relation to the sum of x plus y, h is 0.08 to 0.2 total for all A atoms, k is 0.15 to 0.3 l is zero to 0.1, n is 0.02 to 0.15, and x is 2 n to 3.2 n, and wherein said glass composition has a fluorescent decay time greater than 450 microseconds at a wave length of about 1050 nm, a cross-section of stimulated emission greater than 3.3 × 10$^{-20}$cm.$^2$, and an $n_2$ value of less than 0.6 × 10$^{-13}$cm.$^2$/(statvolts)$^2$ 2. A glass composition suitable for use as an active laser component and consisting essentially of the following components in the relationship expressed according to the following atomic formula $$Na_h^{1+} Be_k^{2+} Al_l^{3+} Nd_m^{3+} P_n^{5+} (O_x^{2-} F_y^{1-})$$

wherein neodymium is present in a laseable amount up to m=0.015, 2x plus y is always 1, h, k, l, m and n represent the number of atoms to which they are subscripted with relation to the sum of x plus y, h is 0.08 to 0.2, k is 0.15 to 0.3, l is zero to 0.1, n is 0.02 to 0.15, and x is 2 n to 3.2 n, and wherein said glass composition has a fluorescent decay time greater than 450 microseconds at a wave length of about 1050 nm, a cross-section of stimulated emission greater than 3.3 × 10$^{-20}$cm.$^2$, and an $n_2$ value of less than 0.6 × 10$^{-13}$cm.$^2$/(statvolts)$^2$ 3. A glass composition suitable for , K$^{as \ an \ active \ laser}$ component and consisting essentially of the following components in the relationship expressed according to the following atomic formula $$A_{H^{38}} Be_k^{2+} Al_l^{3+} Nd_m^{3+} P_n^{5+} (O_x^{2-} F_y^{1-})$$

wherein

A is at least one of the group Na$^{1+}$, Li$^{1+}$, K$^{1+}$, Rb$^{1+}$ and Cs$^{1+}$, 2x plus y is always 1, h, k, l, m and n represent the number of atoms to which they are subscripted with relation to the sum of x plus y, h is 0.08 to 0.2 total for all A atoms, k is 0.15 to 0.3 l is zero to 0.1, m is 0.0001 to 0.015, n is 0.02 to 0.15, and x is 2 n to 3.2 n, and wherein said glass composition has a fluorescent decay time greater than 450 microseconds at a wave length of about 1050 nm, a cross-section of stimulated emission greater than 3.3 × 10$^{-20}$ cm.$^2$, and an $n_2$ value of less than 0.6 × 10$^{-13}$cm.$^2$/(statolts)$^2$ 4. A glass composition suitable for use as an active laser component and consisting essentially of the following components in the relationship expressed according to the following atomic formula $$Na_h^{1+} Be_k^{2+} Al_l^{3+} Nd_m^{3+} P_n^{5+} (O_x^{2-} F_y^{1-})$$

wherein 2x plus y is always 1, h, k, l, m and n represent the number of atoms to which they are subscripted with relation to the sum of x plus y, h is 0.08 to 0.2,
k is 0.15 to 0.3,
m is 0.0001 to 0.015,
l is zero to 0.1,
n is 0.02 to 0.15, and
x is 2 n to 3.2 n, and wherein said glass composition has a fluorescent decay time greater than 450 microseconds at a wave length of about 1050 nm, a cross-section of stimulated emission greater than $3.3 \times 10^{-20}$ cm.$^2$, and an $n_2$ value of less than $0.6 \times 10^{-13}$ cm.$^2$/(statvolts)$^2$ 5. A glass composition suitable for use as an active laser component and consisting essentially of the following components in the relationship expressed according to the following atomic formula

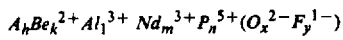

$$A_h Be_k^{2+} Al_l^{3+} Nd_m^{3+} P_n^{5+} (O_x^{2-} F_y^{1-})$$

wherein

A is at least one of the group $Na^{1+}$, $Li^{1+}$, $K^{1+}$, $Rb^{1+}$ and $Cs^{1+}$, neodymium is present in a laseable amount up to m = 0.015, 2x plus y is always 1, h, k, l, m and n represent the number of atoms to which they are subscripted with relation to the sum of x plus y, h is 0.05 to 0.25 total for all A atoms,
k is 0.1 to 0.35,
l is zero to 0.15,
n is 0.02 to 0.15, and
x is 2 n to 3.2 n, and wherein said glass composition has a fluorescent decay time greater than 450 microseconds at a wave length of about 1050 nm, a cross-section of stimulated emission greater than $3.3 \times 10^{-20}$ cm.$^2$, and an $n_2$ value of less than $0.6 \times 10^{-13}$ cm.$^2$/(statvolts)$^2$ 6. A glass composition suitable for use as an active laser component and consisting essentially of the following components in the relationship expressed according to the following atomic formula

$$Na_h^{1+} Be_k^{2+} Al_l^{3+} Nd_m^{3+} P_n^{5+} (O_x^{2-} F_y^{1-})$$

wherein neodymium is present in a laseable amont up to m = 0.015, 2x plus y is always 1, h, k, l, m and n represent the number of atoms to which they are subscripted with relation to the sum of x plus y, h is 0.05 to 0.25,
k is 0.1 to 0.35,
l is zero to 0.15,
n is 0.02 to 0.15, and
x is 2 n to 3.2 n, and wherein said glass composition has a fluorescent decay time greater than 450 microseconds at a wave length of about 1050 nm, a cross-section of stimulated emission greater than $3.3 \times 10^{-20}$ cm.$^2$, and an $n_2$ value of less than $0.6 \times 10^{-13}$ cm.$^2$/(statvolts)$^2$ 7. A glass composition suitable for use as an active laser component and consisting essentially of the following components in the relationship expressed according to the following atomic formula

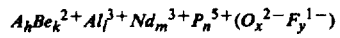

$$A_h Be_k^{2+} Al_l^{3+} Nd_m^{3+} P_n^{5+} (O_x^{2-} F_y^{1-})$$

wherein

A is at least one of the group $Na^{1+}$, $Li^{1+}$, $K^{1+}$, $Rb^{1+}$ and $Cs^{1+}$,
2x plus y is always 1, h, k, l, m and n represent the number of atoms to which they are subscripted with relation to the sum of x plus y, h is 0.05 to 0.25 total for all A atoms,
k is 0.1 to 0.35,
l is zero to 0.15,
m is 0.0001 to 0.015,
n is 0.02 to 0.15, and
x is 2 n to 3.2 n, and wherein said glass composition has a fluorescent decay time greater than 450 microseconds at a wave length of about 1050 nm, a cross-section of stimulated emission greater than $3.3 \times 10^{-20}$ cm.$^2$, and $n_2$ value of less than $0.6 \times 10^{-13}$ cm.$^2$/(statvolts)$^2$ 8. A glass composition suitable for use as an active laser component and consisting essentially of the following components in the relationship expressed according to the following atomic formula

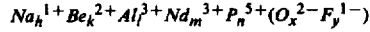

$$Na_h^{1+} Be_k^{2+} Al_l^{3+} Nd_m^{3+} P_n^{5+} (O_x^{2-} F_y^{1-})$$

wherein 2x plus y is always 1, k, l, m and n represent the number of atoms to which they are subscripted with relation to the sum of x plus y, h is 0.05 to 0.25,
k is 0.1 to 0.35,
m is 0.0001 to 0.015,
l is zero to 0.15,
n is 0.02 to 0.15, and
x is 2 n to 3.2 n, and wherein said glass composition has a fluorescent decay time greater than 450 microseconds at a wave length of about 1050 nm, a cross-section of stimulated emission greater than $3.3 \times 10^{-20}$ cm.$^2$, and an $n_2$ value of less than $0.6 \times 10^{-13}$ cm.$^2$/(statvolts)$^2$

* * * * *